United States Patent Office 3,382,954
Patented May 14, 1968

3,382,954
ARRESTER GEAR FOR AIRCRAFT
William Charlson, North Bedford, England, assignor to Minister of Aviation in Her Britannic Majesty's Government of the United Kingdom of Great Britain and Northern Ireland, London, England
Filed Sept. 2, 1966, Ser. No. 577,096
3 Claims. (Cl. 188—94)

ABSTRACT OF THE DISCLOSURE

An arresting mechanism for landing aircraft where a piston traveling in a water filled tube forces the water through valves to resist the force of the landing aircraft is provided with a piston retracting mechanism together with the sealing means between the retracting mechanism and the water filled tube.

---

This invention relates to arrester gear for aircraft of the kind which may be broadly described as being of the liquid spray type.

A particular type of such gear includes a cable which is engaged by the aircraft on landing, the cable being attached to a piston housed in a long liquid filled cylinder or tube situated approximately horizontally alongside the runway, the cylinder having exhaust ports along its length. The arresting of the aircraft is brought about by movement of the piston against the liquid in the tube to pump the liquid out of the ports. In general the liquid is water.

One serious problem associated with the type of hydraulic gear described is the tendency for water to leak from the filled tube. At the end where the arrester cable enters the water filled tube leakage is prevented by a gland. Leakage via the exhaust ports is prevented either by ensuring the tubes are level over their whole length or by fitting to the ports valves which lift in response to the pressure generated during arrest.

At the other, or resetting end of the tube, through which a second cable passes by which the piston is returned to its datum position, leakage of water that passes the piston may occur. This leakage past the piston is unavoidable because it is not practicable to ensure that the piston is a leakproof fit in the tube, nor is this essential for the efficiency of the arrester gear.

It has been found difficult to prevent this escape of water from the resetting end of the tube.

The problem arises from the difficulty of ensuring that the piston will always be returned to the same datum position. This is almost impossible in practice because of stretch in the very long lengths of the various cables which are put in sufficient tension in resetting to ensure that the arrester gear cable proper which traverses the runway is taut before an arrest.

Because the piston cannot be positioned with precision, the use of fixed position seals for the piston or of grease or plastic compounds injected around the piston has been quite unsatisfactory.

One proposal has been to accept the leakage past the piston but to prevent escape from the resetting end of the tube by forming the end with an upstanding neck of vertical height greater than any other part of the tube. This construction is hazardous if the ground level at the resetting end is below that of the gland end because the neck may of necessity stand well above the surface of the runway. Resetting is also made more difficult, if the neck is long.

The invention involves eliminating the upstanding neck and providing means for sealing around the piston over a range of piston positions.

According to the invention, arrester gear of the liquid spray type comprises a hollow sealing member within the tube at the resetting end and in fluid tight contact or connection therewith and being relatively movable axially of the tube to make sealing contact with the piston of the arrester gear when the piston is located at or near the resetting end of the tube, provision being made for connecting a resetting cable to the piston via the sealing member.

The sealing member may be a rigid tube slidable within the water tube in surface contact with a fluid tight gland or sealing ring between itself and the tube, or it may be an axially extensible bellows internally of and secured at one end fluid tight to the resetting end of the water tube. In the latter case means are provided for extending the bellows to effect sealing contact with the piston, which means may be the aforementioned rigid tube.

The piston may comprise an axial projection which may be a central boss or an annulus and the sealing contact between the piston, the sealing member and the tube may be made entirely in the region of this projection.

Three embodiments of the invention will now be described with reference to the accompanying diagrammatic drawings in which.

Figure 1:
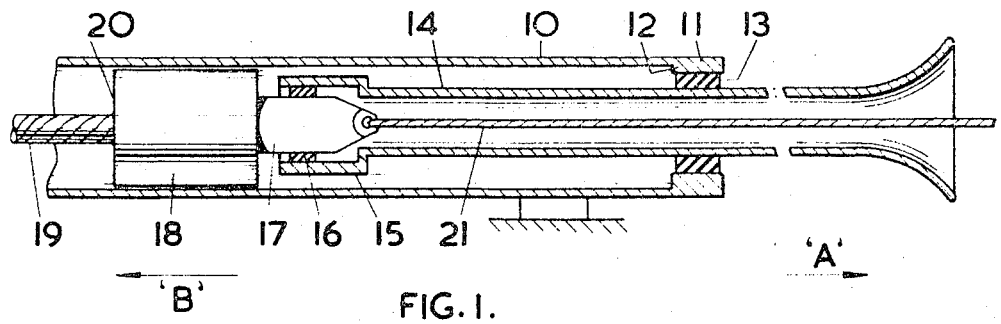
FIGURE 1 is a side view in cross section of a first form of the invention.

Referring to FIGURE 1 the components of the arrester gear shown include a water tube 10 which has at the resetting end 11 an inwardly directed rim 12 carrying a flexible annular sealing ring 13. The sealing ring 13 locates and seals against the outer surface of a rigid tubular axially slidable sealing member 14 having at its inward end 15 a flexible annular sealing ring 16 which is disengageably in fluid tight contact with a boss 17 on the piston 18 of the gear. The arrester gear cable 19 is attached at the inward face 20 of the piston and the resetting cable 21 to the piston extension 17. The resetting cable 21 passes out of the water tube 10 via the tubular member 14 which is formed with a bell mouth to minimise rubbing damage. A resetting mechanism, not shown, is provided for pulling the piston in the direction of arrow A to the position shown by means of the cable 21.

Figure 2:
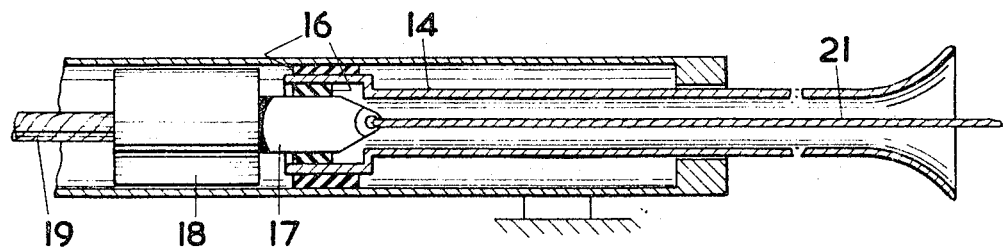
FIGURE 2 is a side view in cross section of the second form.

Referring to FIGURE 2, the essential difference between this embodiment and that of FIGURE 1 is that the sealing ring 16 is also secured to the tubular member 14.

It will be understood, of course, that the boss 17 may be formed as a hollow annulus and that a seal between it and the member 14 may be effected on the inner face of the annulus if this is a mechanically preferable arrangement for some circumstances.

Figure 3:
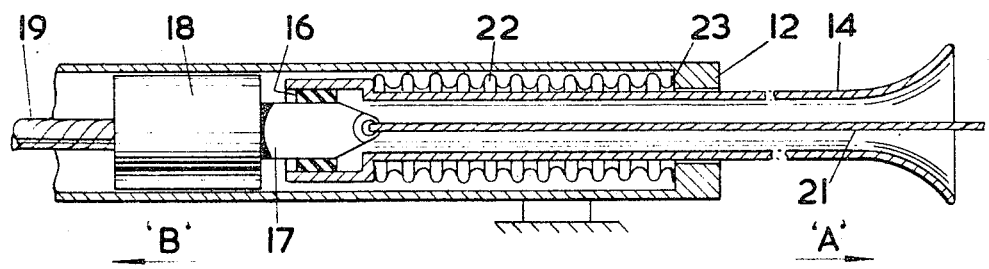
FIGURE 3 is a side view in cross section of the third form.

Referring to FIGURE 3, in comparison with FIGURES 1 and 2, the sealing ring 13 is obviated and the sealing ring 16 is mounted on the inward end of an extensible bellows 22 attached at 23 to the rim 12. The tube 14 is retained for extending the bellows and for guiding the cable 20 as will be described.

Referring to FIGURES 1 and 2, in use, the water tube on the arrester cable side of the piston is maintained full of water. During an arrest the piston is displaced along the tube 10 in the direction of arrow B. The gear is then reset by traction applied to the cable 21 which draws the piston in the direction of arrow A towards the resetting end 11 of the tube 10 until it assumes a position approximately as shown in the figures. When the piston is in this position, the tubular sealing member 14, or the bellows 22, are slid or extended in the direction of arrow B to bring the sealing ring 16 against the boss 17 on the piston 18. In this position any water which leaks past the piston is prevented from escaping by the sealing effect of the sealing ring 16 at the inward end of the member 14 and by the sealing of the ring 13 on the outer face of the member 14, similar leakage paths being closed in the case of the apparatus of FIGURE 3 by the sealing ring 16 as before and the attachment of the bellows to the water tube at the rim 12.

I claim:

1. In an arresting mechanism for aircraft of the type having an arrester cable to be engaged by the aircraft and a piston, adapted to be moved longitudinally of a water filled tube, connected to the arrester cable, a retractor mechanism comprising:

a boss attached to the back end of the piston;

a longitudinally movable tubular member of a length substantially equal to the longitudinal travel of the piston extending from the piston to beyond the back end of the water filled tube, said tubular member enclosing and in sealing relationship with said boss;

a retractor cable attached to said boss and extending within and beyond said tubular member; and means sealing the tubular member to said water filled tube to prevent the loss of water from said water filled tube.

2. In an arresting mechanism, a retractor mechanism according to claim 1 wherein the tubular member extends beyond the water filled tube to terminate in a flared end preventing the tubular member from completely entering the water filled tube.

3. An arrester mechanism according to claim 1 wherein the sealing means at the boss end of the tubular member engages the inner wall of the water filled tube to permit longitudinal movement of the tubular member while maintaining the sealing relationship.

References Cited

UNITED STATES PATENTS

| | | | |
|---|---|---|---|
| 3,037,485 | 6/1962 | Adams | 74—18.2 X |
| 3,160,910 | 12/1964 | Quinn | 188—100 X |
| 3,272,460 | 9/1966 | Thomlinson | 244—110 |

FERGUS S. MIDDLETON, *Primary Examiner.*

MILTON BUCHLER, *Examiner.*

G. E. HALVOSA, *Assistant Examiner.*